(No Model.)  2 Sheets—Sheet 1.

C. B. CLARK.
FRUIT DRIER.

No. 522,649. Patented July 10, 1894.

Witnesses.
A. Ruppert,
H. A. Daniels

Inventor.
Cullen B. Clark,
Per
Thomas P. Simpson,
atty.

(No Model.)　　　　　　　　C. B. CLARK.　　　　2 Sheets—Sheet 2.
FRUIT DRIER.
No. 522,649.　　　　　　　　　　　Patented July 10, 1894.
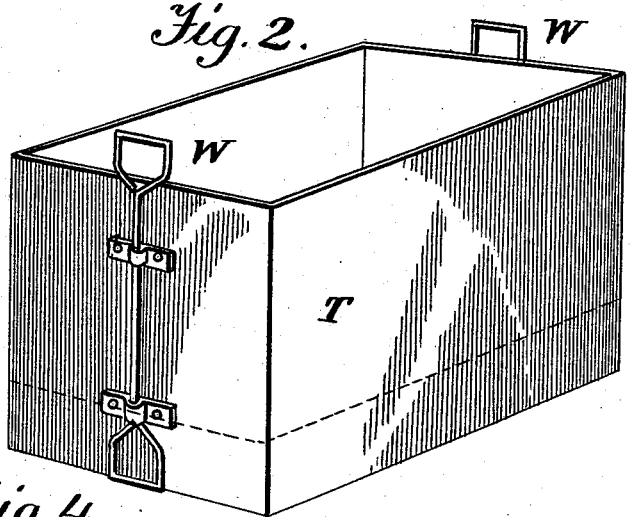
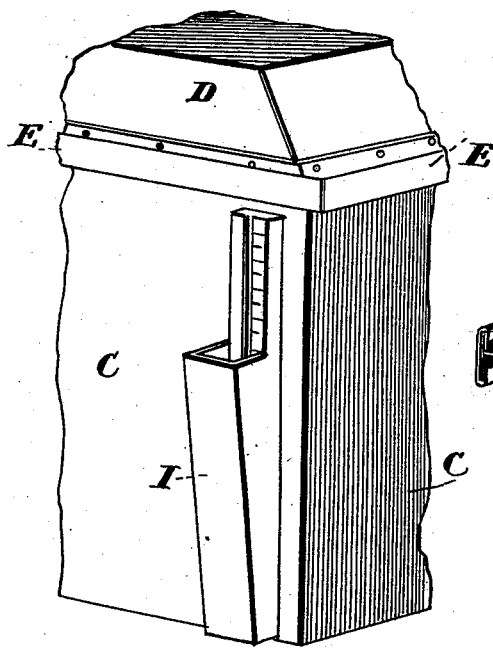
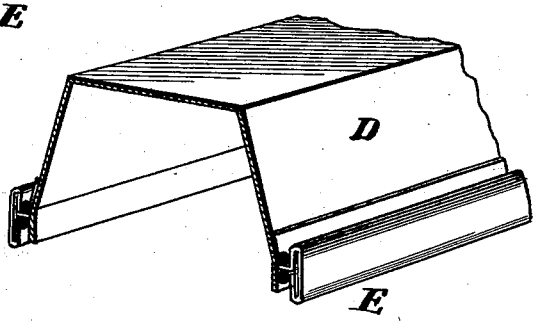
Witnesses.
A. Ruppert
H. A. Daniels
Inventor.
Cullen B. Clark,
Per
Thomas P. Simpson
Atty

UNITED STATES PATENT OFFICE.

CULLEN B. CLARK, OF ENGLEWOOD, ILLINOIS.

FRUIT-DRIER.

SPECIFICATION forming part of Letters Patent No. 522,649, dated July 10, 1894.

Application filed August 3, 1893. Serial No. 482,312. (No model.)

*To all whom it may concern:*

Be it known that I, CULLEN B. CLARK, a citizen of the United States, residing at Englewood, in the county of Cook and State of Illinois, have invented certain new and useful Improvements in Fruit-Driers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a machine adapted for the purpose of drying fruit and making preserves or jams.

Figure 1:
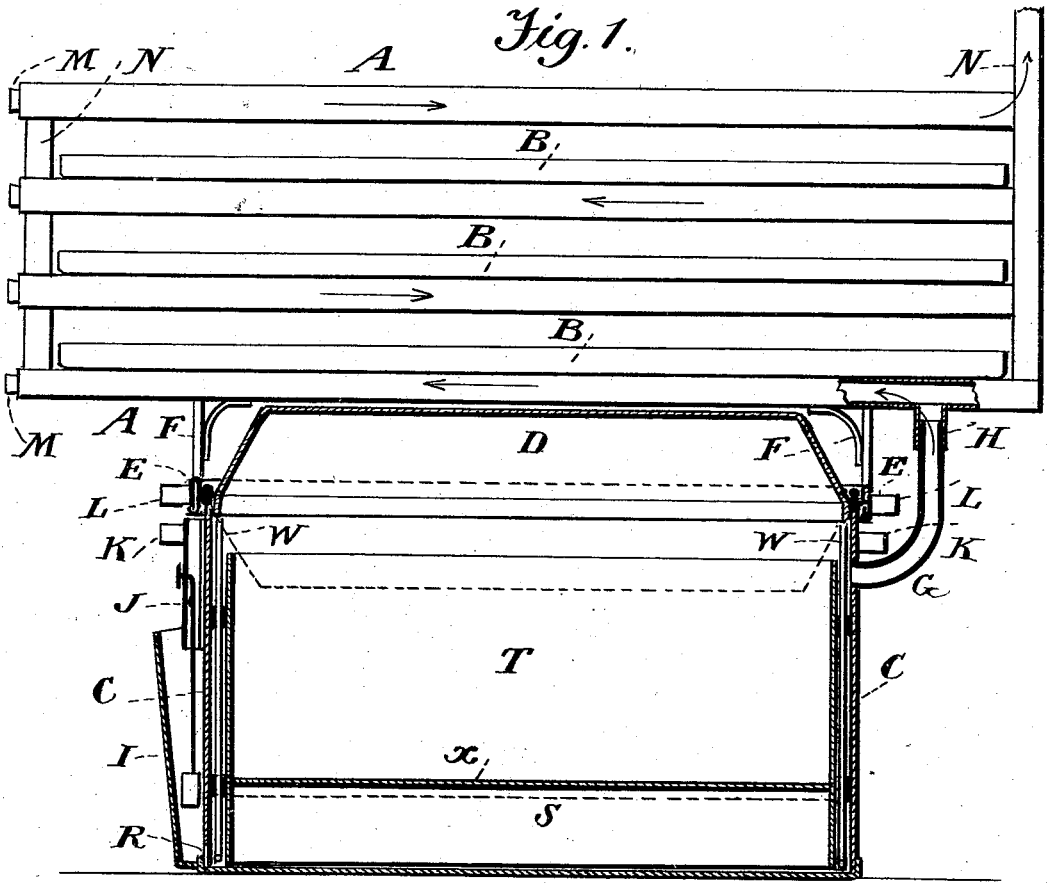
Figure 3:
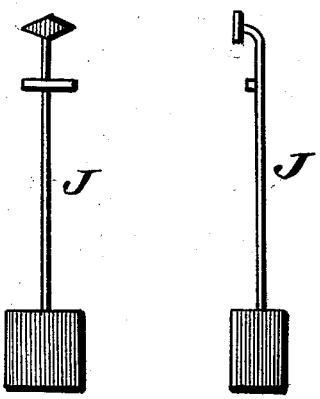

Figure 1 of the drawings is a vertical section; Fig. 2 a perspective view of my reversible steaming basket with sliding handles; Fig. 3 a detail view of the cork indicator; Fig. 4 a detail view of the funnel tube-indicator; Fig. 5 a detail view, showing the reversible pan cover rim with double packing.

In the drawings, A represents the evaporating chambers, B the fruit trays, C the steam generating chamber and D the generator cover adapted to be reversed so as to be used as an evaporating pan for making preserves and jams. The cover D has a double packed rim E with handles L L while the generator C has the handles K K.

The evaporator A has a steam pipe G connecting with the generator C so that the steam will pass therethrough as indicated by the arrows and also a thimble H which telescopes with the upper end of the pipe.

I is a funnel provided with the indicator J.

The evaporator A has the screw or plug hole M in the end of its chambers for the purpose of drying or oiling them to prevent rust.

N are steam-conducting pipes and corner supports for the evaporating chambers which have leg-supports F F standing in the packed rim E.

S represents the water line and R a hole in the generator to allow the passage of water, and communicating with the funnel I.

T is my reversible steaming basket for use in the steam generator C with fruits and vegetables previous to drying them. It has a bottom X which is placed just above the water line and handles W W adjustable to the top in either position. The reversibility enables me to obtain a greater or less depth as occasion may require.

The water is supplied to the generator through the funnel in which also water remains so as to prevent the escape of steam from the generator; the funnel also supplies a communication with the indicator. The cork floating in the funnel communicates with the index scale by the index finger and wire attached to cork. There should only be a depth of water in the funnel indicator of about two inches. Thus both high and low water must be indicated. The indicator wire is protected by shoulder guards which also support and protect the indicator in the use of the funnel.

Having thus described all that is necessary to a full understanding of my invention, what I claim as new, and desire to protect by Letters Patent, is—

A fruit evaporator consisting of a steam generator and a superposed evaporating chamber connected by a steam-pipe, the evaporating chamber being provided with vertical pipes N, legs F and adapted to receive the trays B and the generator having a reversible cover with packed rim substantially as shown and described.

In testimony whereof I affix my signature in presence of two witnesses.

CULLEN B. CLARK.

Witnesses:
F. B. MARKEY,
G. B. FALLIS.